United States Patent
Baaken

(10) Patent No.: US 7,654,068 B2
(45) Date of Patent: Feb. 2, 2010

(54) DEVICE FOR ADJUSTING THE POSITION OF THE POST-ACCELERATOR IN AN AGRICULTURAL HARVESTING MACHINE

(75) Inventor: Verena Baaken, Krefeld (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/036,381

(22) Filed: Feb. 25, 2008

(65) Prior Publication Data

US 2008/0264024 A1 Oct. 30, 2008

(30) Foreign Application Priority Data

Feb. 26, 2007 (DE) .................. 10 2007 009 587

(51) Int. Cl.
*A01D 61/00* (2006.01)
(52) U.S. Cl. .............................. 56/16.4 B; 241/101.72; 241/186.3
(58) Field of Classification Search .............. 56/16.4 A, 56/16.4 B, 16.4 R, 16.6, 153, DIG. 1, DIG. 9; 241/101.01, 101.02, 101.74, 101.72, 186.3
See application file for complete search history.

(56) References Cited

U.S. PATENT DOCUMENTS

| 5,863,005 | A | * | 1/1999 | Bramstedt et al. | ..... 241/101.742 |
| 6,425,232 | B1 | * | 7/2002 | Desnijder et al. | ........ 56/16.4 B |
| 6,539,693 | B2 | * | 4/2003 | Krone et al. | .................. 56/16.6 |
| 6,604,352 | B1 | * | 8/2003 | Tyvaert et al. | ........... 56/16.4 B |
| 6,988,352 | B2 | * | 1/2006 | Van Vooren | .............. 56/16.4 R |

FOREIGN PATENT DOCUMENTS

| DE | 197 32 722 | 2/1999 |
| DE | 102 31 316 | 1/2004 |
| EP | 1358788 A2 * | 11/2003 |

* cited by examiner

*Primary Examiner*—Árpád Fábián-Kovács
(74) *Attorney, Agent, or Firm*—Michael J. Striker

(57) ABSTRACT

In a device for adjusting the crop material passage at the post-accelerator in an agricultural harvesting machine, in particular in a self-propelled forage harvester that includes at least one front attachment for picking up the crop material, and that is assigned to at least one processing device, the crop material handed off by the processing device passes through at least one post-accelerator, which is at least partially enclosed by a machine housing and is movable relative to the machine housing via a displacing mechanism, while the post-accelerator is fixed on the machine housing is position such that it is decoupled from the displacing mechanism.

17 Claims, 3 Drawing Sheets

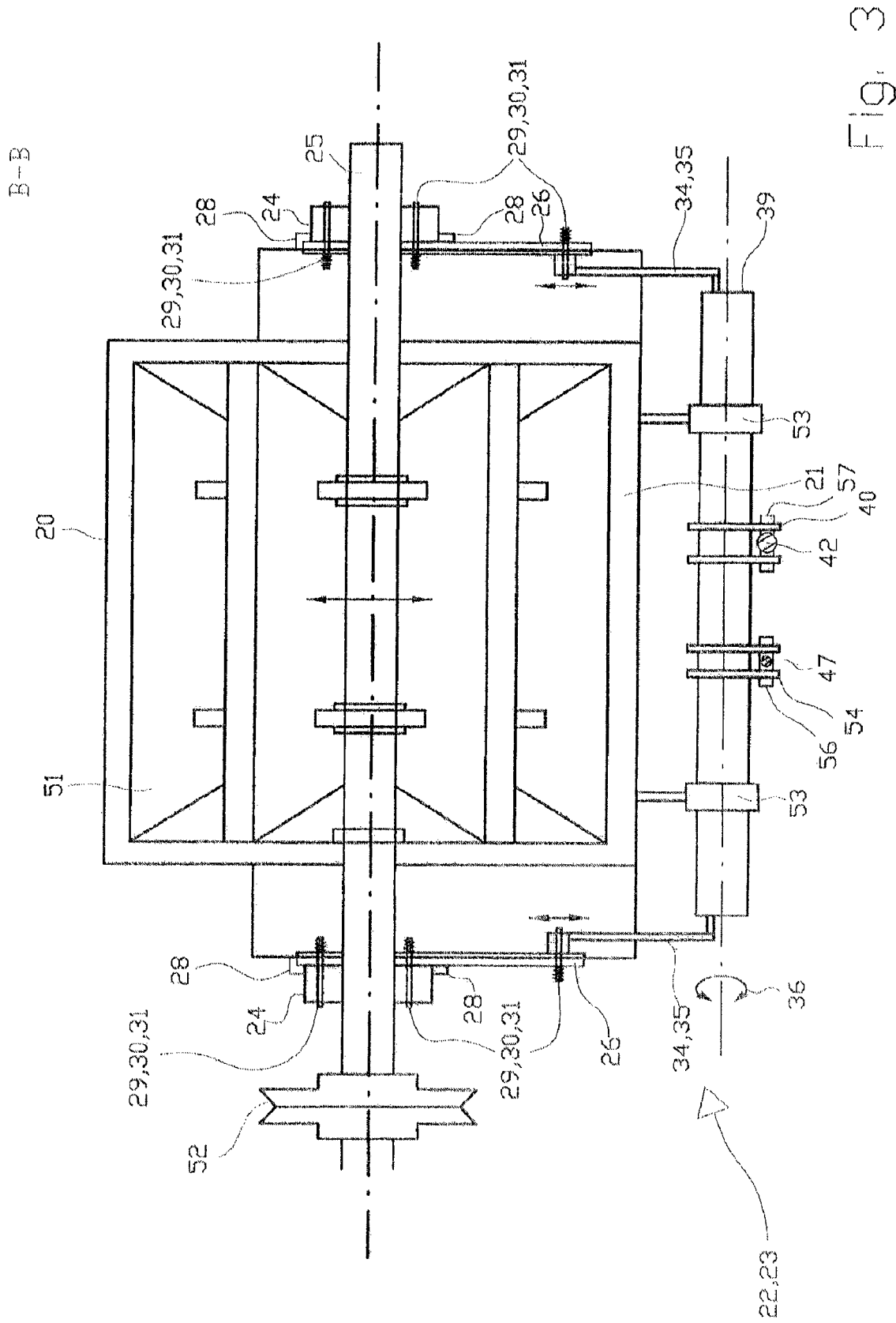

DEVICE FOR ADJUSTING THE POSITION OF THE POST-ACCELERATOR IN AN AGRICULTURAL HARVESTING MACHINE

CROSS-REFERENCE TO A RELATED APPLICATION

The invention described and claimed hereinbelow is also described in German Patent Application DE 10 2007 009 587.4 filed on Feb. 26, 2007. This German Patent Application, whose subject matter is incorporated here by reference, provides the basis for a claim of priority of invention under 35 U.S.C. 119(a)-(d).

BACKGROUND OF THE INVENTION

The present invention relates to a device for adjusting the position of the post-accelerator inside an agricultural harvesting machine, in particular inside a forage harvester.

Due to the trend toward developing increasingly more powerful forage harvesters with wider front harvesting attachments, the performance requirements on the post-accelerator have also increased. In addition, different weather conditions, throughput masses and types affect the quality and reliability of the conveyance of crop material inside the harvesting machine. For example, when grass is drawn into the machine under moist conditions, and when the mass of conveyed material differs, clumps may form, which greatly impair the flow of crop material and, in the extreme case, may result in blockage. These problems affect conveyance inside the harvesting machine and during ejection.

Publication DE 19732722 describes a post-accelerator in the form of a conveying fan for a forage harvester. It should be possible to clean out this conveying fan quickly if blockages occur. A wearing plate is installed for this purpose in the feed chute on the frame part, in the direct vicinity of the conveying fan. Both of the devices are removable, thereby making it possible to access the interior of the fan and remove the blockage. In addition, the devices are designed such that the distance between them may be varied, thereby enabling the gap between them and the rotational circle of the conveying rotor to be changed manually.

The disadvantage of the embodiment disclosed in DE 19732722 is that the amount of intervention time is considerable, since intervention must be performed manually. Under these conditions, it is not economical to respond spontaneously to changes in crop material flow, and this response may not be carried out immediately without interrupting the harvesting operation. In addition, the various adjusting screws must be installed exactly, since even a slight deviation of a single adjusting screw results in uneven conditions on the inside of the rotational housing. As a result, moist crop material—in particular—becomes stuck, which may lead to increased build-up and disruption of crop material flow. This section must therefore be monitored on a regular basis. This also applies for the density of the crop material. In all, it is not possible according to the invention disclosed in DE 19732722 to respond to changes in the flow of crop material without disrupting field work. In addition, the response must be carried out manually, which results in considerable down time and assembly work. If the cleaning and assembly work is not carried out, crop material is lost, since the poorer flow of crop material prevents an optimal stream of ejected crop material into a hauling vehicle. Depending on the weather conditions and the effects of wind, this can result in up to 30% loss in crop material.

In addition, publication DE 102 31 316 A1 discloses a post-accelerator of a forage harvester that is adjustable using an axle-displacing mechanism. The axle-displacing mechanism, which is supported in a support frame fixedly located on the machine housing, acts on at least one side of the axle of the post-accelerator. To guide the post-accelerator, the post-accelerator includes integrated sliding blocks, which may slide back and forth on the guide surfaces located parallel with each other on the support frame. The post-accelerator is displaced using four guide axles, which are integrated—in pairs—in the axle-displacing mechanism. The guide axles are fixed in position with one end on the particular sliding block, thereby enabling the fixing in position of the post-accelerator to be coupled with the axle-displacing mechanism.

The disadvantage of this embodiment is that, if the axle-displacing mechanism fails or has been removed, it is no longer ensured that the post-accelerator is fixed in position to an adequate extent, and the problem must be eliminated before the harvesting process may continue.

SUMMARY OF THE INVENTION

The object of the present invention, therefore, is to prevent the disadvantages of the cited related art and ensure—in a simple and cost-favorable manner—that the gap width between the rotational circle of the post-accelerator and the machine housing may be adjusted exactly and automatically, without having to interrupt the harvesting process.

In keeping with these objects and with others which will become apparent hereinafter, one feature of the present invention resides, briefly stated, in a device for adjusting a crop material passage at a post-accelerator which is at least partially enclosed by a machine housing in an agricultural harvesting machine, the device comprising at least one processing device configured so that a crop material handed off by said processing device passes through the post-accelerator a displacing mechanism configured to move the post-accelerator relative to the machine housing; and guide rails for fixing the post-accelerator in position on the machine housing such that it is decoupled from said displacing mechanism.

Given that the fixing of the post-accelerator in position takes place such that it is decoupled from the displacing mechanism, it is ensured that the crop material passage between the rotational circle of the post-accelerator and the machine housing is adjusted exactly, and that, if the displacing mechanism fails or becomes damaged, the post-accelerator will remain fixed in position. The harvesting process therefore need not be interrupted.

In an advantageous refinement of the present invention, sliding devices are assigned to the ends of the post-accelerator in order to fix it in position, the bottom-side lower edges of which lie on the guide surfaces connected with the machine housing. The sliding devices are fixed in position on the machine housing in a displaceable/frictional manner using at least one fixing element, thereby making it possible to displace the post-accelerator using a particularly simple design, while also fixing the post-accelerator in position on the machine housing using at least one fixing element, independently of the displacing mechanism for adjusting the post-accelerator.

Given that the post-accelerator is adjusted using a displacing mechanism designed as a transmission system a very precise adjustment of the crop material passage may be attained. This is enhanced, in particular, by the fact that the fixing in position of the post-accelerator is decoupled from the displacing mechanism, thereby preventing the forces acting on the post-accelerator from being transferred to the displacing mechanism. This advantageously reduces the wear on the displacing mechanism.

Given that the transmission system is formed essentially by at least two transmission elements rotatably connected at one end with the sliding devices of the post-accelerator, which is operatively connected at the other end with a further transmission element supported such that it may rotate around a curved path—it being possible to adjust the position of the at least two transmission elements in a synchronous manner using the further transmission element—the mobility and, therefore, displacement of the post-accelerator may be attained using a simple design. The further transmission element is advantageously designed as a continuous shaft, and it is rotatably mounted on the machine housing using at least two bearing elements.

According to a preferred embodiment, at least one telescoping actuator is assigned to the further transmission element, the telescoping actuator being connected at one end via a pivot point with a lever arm assigned to the further transmission element, and being connected at the other end via a pivot point with a holding device installed on the machine housing, thereby making it possible to adjust the post-accelerator in the horizontal direction in a synchronous and finely-tuned manner using as few transmission parts as possible. This is necessary due to the high rotational speed of the post-accelerator and the forces resulting therefrom. If the position were changed in an uneven manner, the post-accelerator would become tilted in the conveyor chute, thereby resulting in damage and down time to the agricultural harvesting machine. To improve the accuracy of the adjustment, it is advantageously carried out using an electric servomotor or a hydraulic cylinder. In order to remain in a pre-set adjustment region of the post-accelerator, however, a restraint device with two end positions is assigned to the further transmission element, thereby ensuring that the maximum permissible adjustment region cannot be left even if the electric motor or hydraulic cylinder malfunctions, and thereby preventing damage to the post-accelerator itself or the machine housing.

In a further advantageous refinement of the present invention, the post-accelerator is adjusted depending on the position of the transfer device located downstream of the post-accelerator. When the crop material is to be transferred to a hauling vehicle located further away, this requires greater throwing action of the post-accelerator. As such, the crop material passage between the rotational circumference of the post-accelerator and the inner wall of the machine housing is reduced, thereby resulting in an acceleration of the crop material.

Due to the fact that the impeller blades located on the post-accelerator become worn by raw and/or aggressive conveyed material, in an advantageous refinement of the present invention, the axle of the post-accelerator is adjusted depending on the state of wear of the impeller bladed assigned to the post-accelerator, thereby ensuring that the preselected gap width between the post-accelerator and the machine housing remains constant, even during long harvesting operations.

In the simplest case, a control unit for operating the displacing mechanism is located in the driver's cab of the agricultural harvesting machine. The operator is therefore able to manually adjust the gap width between the rotational circle of the post-accelerator and the machine housing at any time—e.g., when the crop material properties change—in order to attain optimal throwing action.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a top view of the post-accelerator, in a cross-sectional view.

DESCRIPTION OF THE PREFERRED EMBODIMENTS

Figure 1:
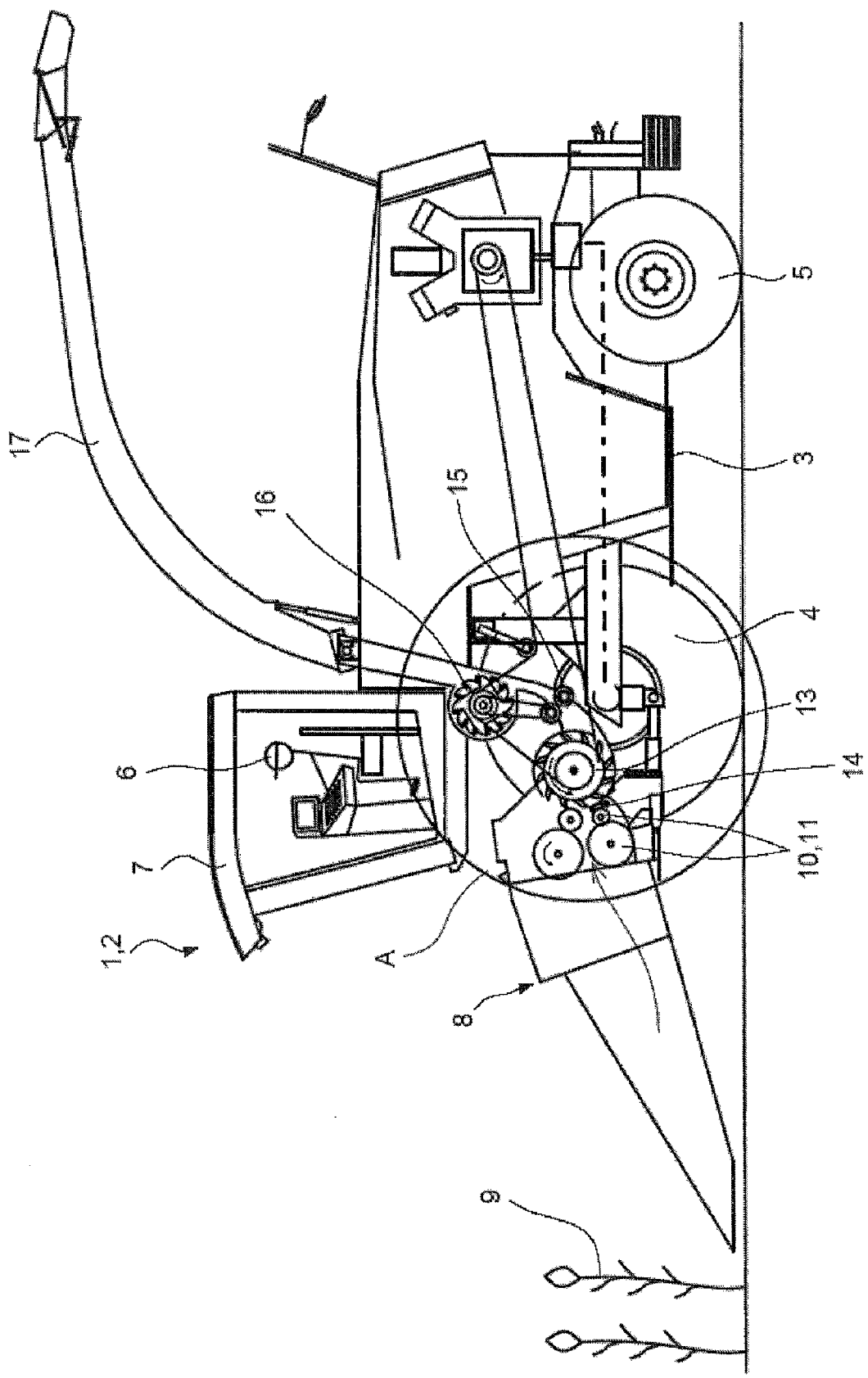
FIG. 1 shows a self-propelled forage harvester, in a side view.

FIG. 1 shows a sectional side view of an agricultural harvesting machine 2 designed as a self-propelled forage harvester 1. It is built on a frame 3, which is carried by front and rear wheels 4, 5. Forage harvester 1 is operated by operator 6 located in driver's cab 7, from which it is possible to see front attachment 8 attached to the front of forage harvester 1.

In the working mode of forage harvester 1, front attachment 8 picks up crop material 9, cuts it and delivers it to downstream intake and compression rollers 10, 11. Intake and compression rollers 10 guide crop material 9 to downstream, rotating chopper drum 13 with knives 12 mounted on it which fragmentize crop material 9 on a shear bar 14. Fragmentized crop material 9 is subsequently transferred to a post-fragmentation device 15, before it is drawn into post-accelerator 16. The task of post-fragmentation device 15 is to pound the corn kernels, when corn is the crop being harvested. Post-fragmentation device 15 may therefore be eliminated entirely if it is not necessary to pound crop material 9, e.g., when the crop material is grass. Chopped crop material 9 is accelerated by post-accelerator 16, thereby ensuring that it will exit transfer device 17 located downstream of post-accelerator 16 and land in a not-shown hauling vehicle.

Figure 2:
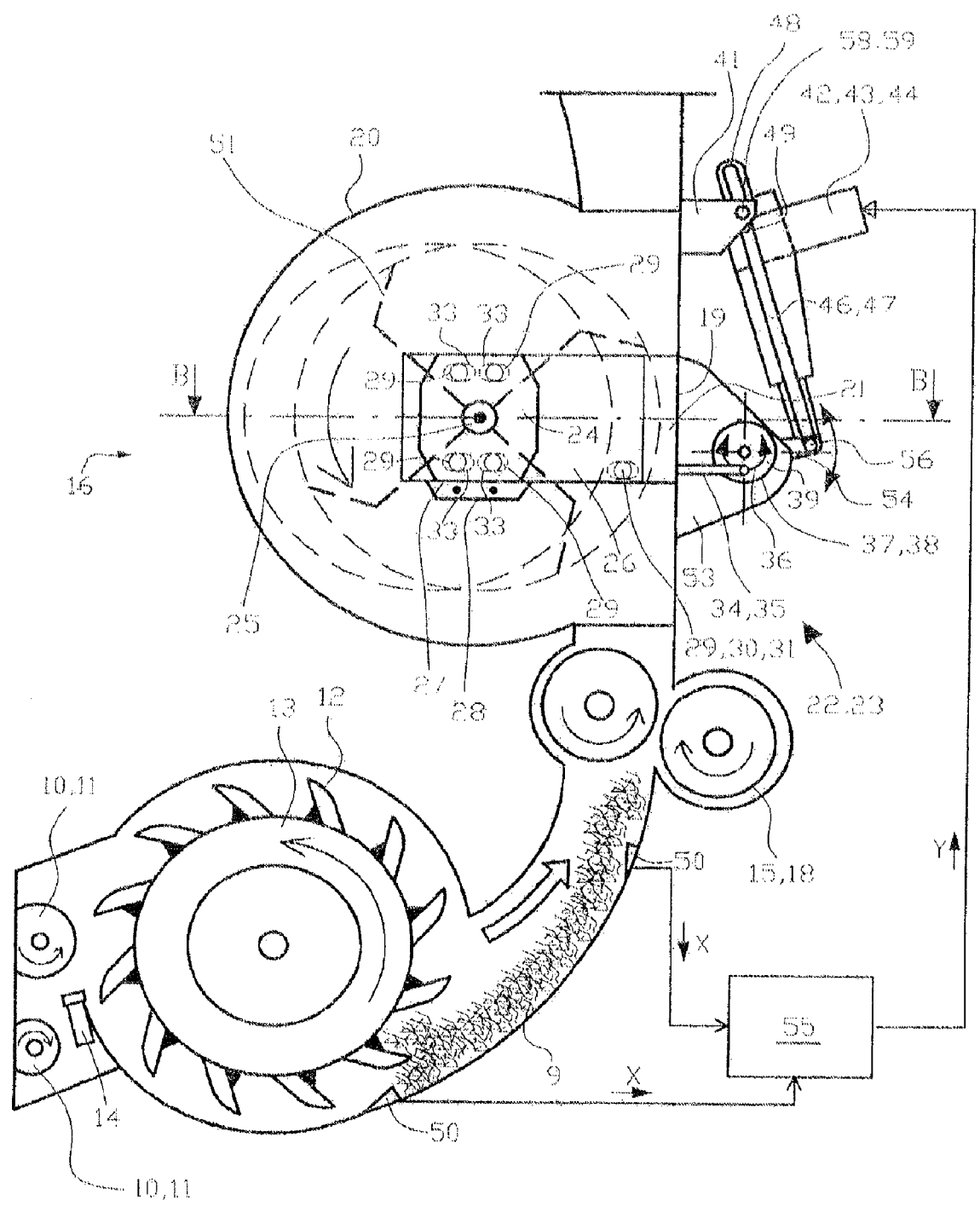
FIG. 2 shows an enlargement of the region labeled "A" in FIG. 1, with the displacing mechanism.

FIG. 2 shows an enlarged sectional view of the region labeled A in FIG. 1, i.e., the crop material flow line in the direction of the arrow, a chopper drum 13, post-fragmentation device 15 in the form of conditioning rollers 18, and a post-accelerator 16. Conditioning rollers 18 transfer chopped crop material 9 to post-accelerator 16, so that it may be conveyed from there via transfer device 17—which is adjustable in the horizontal and vertical directions and is shown in FIG. 1—to a not-shown hauling device assigned to transfer device 17. Chopped crop material 9 flows through crop material passage 21 located between post-accelerator 16 and inner wall 19 of machine housing 20.

According to the present invention, post-accelerator 16 is adjusted relative to inner wall 19 of machine housing 20 using a displacing mechanism 23. Displacing mechanism 23 operates as a transmission system (and therefore also identified with reference character 22), and is operatively connected with post-accelerator 16. The actions of fixing post-accelerator 16 in position and displacing it are decoupled from each other, i.e., displacing mechanism 23/transmission system 22 acts to fix the post-accelerator 16 in position relative to inner wall 19, and acts to displace post accelerator 16 from position relative to inner wall 19. As a result, it is advantageously possible to change the width of crop material passage 21. If damage occurs to displacing mechanism 23 (or transmission system 22), in particular if any of the adjusting elements— described below—of displacing mechanism 23 break, therefore, the harvesting process need not be interrupted.

A sliding device 26 that includes axle 25 of post-accelerator 16 enclosed by bearing 24 is located in the region of post-accelerator 16 located at the end of the axle. Bottom-side lower edge 27 of sliding device 26 rests displaceably on a guide surface 28 located on the outside of machine housing 20. Sliding device 26 is fixed in position on machine housing 20 in a frictional manner using suitable holding elements 29, so that all forces acting on post-accelerator 16 are absorbed by guide surfaces 28 located on the outside of machine housing 20 and by holding elements 29, fully decoupled from displacing mechanism 23. Holding elements 29 that are supported in slots 33 and that are designed as screw connections 31 with springs 30 have proven particularly suitable for this purpose. The tension of springs 31 may be changed if necessary, thereby making it possible to optimally fix sliding device 26 in position.

As shown in FIG. 3 in greater detail, axle 25 of post-accelerator 16 driven by pulley 52 is supported in sliding devices 26, which are located at the ends of the axle. Bearings 24 that enclose axle 25 are integrated in sliding devices 26. Bottom-side lower edges 27 of sliding devices 26 rest displaceably on guide surfaces 28 located on the outside of machine housing 20. Displacing mechanism 23, which acts on at least one end region of axle 25, serves to adjust the position of post-accelerator 16 in machine housing 20. A particularly advantageous design results when displacing mechanism 23 acts on both sliding devices 26 assigned to post-accelerator 16, as shown in FIG. 3. As a result, the distance between post-accelerator 16 and inner wall 19 of machine housing 20 changes evenly within slots 33 provided for this purpose in machine housing 20.

The displacement itself takes place via displacing mechanism 23, which is designed as transmission system 22 and is located largely on the outside of machine housing 20. Transmission system 22 includes two transmission elements 35, which are designed as coupling rods 34 and are each rotatably connected at one end with sliding devices 26 of post-accelerator 16. They are operatively connected at the other end with a further transmission element 38, which is supported such that it may rotate along a curved path 36 and is designed as continuous shaft 37. In order to attain a displacement of sliding devices 26, coupling rods 34 are hingedly located off-center on particular shaft end face 39. Further transmission element 38, which is designed as shaft 37, is rotatably supported via bearing elements 53 and is connected with machine housing 20. Shaft 37 is enclosed by a lever arm 40, to the end of which a telescoping actuator 42 is assigned.

Telescoping actuator 42 is connected with machine housing 20 via a holding device 41 and is rotatably supported at each end. Advantageously, telescoping actuator 42 is designed as hydraulic cylinder 43 or electric linear motor 44, so that the position of post-accelerator 16 within machine housing 20 may be adjusted in a finely-tuned, exact manner. It is also feasible to provide at least one further telescoping actuator 42 in the form of a hydraulic cylinder 43 or electric linear motor 44. By using a hydraulic cylinder 43 or an electric linear motor 44, it is possible to adjust crop material passage 21 in a stepless and/or stepped manner.

In the exemplary embodiment shown, sliding devices 26 and, therefore, post-accelerator 16, are adjusted by swiveling shaft 37 around curved path 36 along the crop material flow line using telescoping actuator 42. When shaft 37 is swiveled, coupling rods 34 operatively connected therewith at the ends change their distance from axle 25 of the post-accelerator in a synchronous manner. To prevent damage to post-accelerator 16 or machine housing 20 caused by an accidental adjustment of the position of post-accelerator 16 outside of a permissible adjustment range, a further lever arm 54 encloses further transmission element 38—which is designed as shaft 37—to the end of which a restraint device 47 is assigned. Restraint device 47 is rotatably supported with machine housing 20 and is designed as actuator 46, the length of which may be changed. In order to stay within a specified adjustment range, restraint device 47 includes an upper end stop 48 and a lower end stop 49.

Sensors 50 located inside machine housing 20 designed to convey the chopped crop material are also shown in FIG. 2. In the exemplary embodiment, sensors 50 are located directly behind chopper drum 13, in front of post-fragmentation device 15, and/or behind post-accelerator 16, in order to detect chopped crop material 9, from the point of intake to ejection. Input signal X, which is generated by sensors 50, is transmitted to an evaluation and control unit, which is known per se and is therefore not shown here. The evaluation and control device is operatively connected with telescoping actuator 42 of displacing mechanism 23, which is designed as transmission system 22.

Control unit 55 as shown operates to receive a signal X from sensors 50 and converts signal X into a control signal Y. Control signal Y controls the telescoping actuator 42 and enables it to receive a manually generated signal (crop material passage enlarge or decrease) from the operator in the cab 7, whereby the telescoping actuator is controlled by a switch.

Based on Input signal X that was generated, the evaluation and control device determines an output signal Y, which triggers the displacement of post-accelerator 16 in the horizontal direction relative to the crop material flow line. In particular, the density, speed, and moisture of chopped crop material 9 are factors that determine the width of crop material passage 21. The crop material density and speed are sensed by sensors 50 in a manner known per se, in order to determine the throughput. The moisture level in the crop material that was sensed serves as a correction factor. If the result of this evaluation is that the throughput quantity is low, post-accelerator 16 moves in the horizontal direction relative to the crop material flow line toward inner wall 19 of machine housing 20. The width of crop material passage 21 is narrowed as a result, and chopped crop material 9 is accelerated due to the stronger action of post-accelerator 16.

Where a high throughput quantity is sensed, the width of crop material passage 21 is increased using displacing mechanism 23, so that chopped crop material 9 passes through machine housing 20 evenly, without causing jams. In addition, axle 25 of post-accelerator 16 may be adjusted based on the position that transfer device 17 assumes in the harvesting process. Transfer device 17 may be swiveled—in a manner known per se—around a horizontal axis and a vertical axis. The exact position of transfer device 17 is determined using position sensors assigned to transfer device 17, which is not described in greater detail here.

The input signals that are generated are transmitted to the evaluation and control device for evaluation and to generate an output signal. If the input signals of the position sensors sensed in the harvesting process mean that strong throwing action and, therefore, high acceleration of crop material 9 to be transferred are required, post-accelerator 16 moves toward inner wall 19 of machine housing 20, thereby increasing the action of post-accelerator 16 on crop material 9 to be conveyed and, therefore, increasing its acceleration. If, however, the input signals ascertained in the harvesting process mean that weaker throwing action and, therefore, a lower acceleration of crop material 9 to be conveyed are required, post-accelerator 16 moves away from inner wall 19 of machine housing 20.

Finally, the position of post-accelerator 16 may be adjusted depending on the state of wear of impeller blades 51 assigned to post-accelerator 16, so that the width of the crop material passage determined to be optimal for the harvesting process remains constant, particularly during long harvesting operations and despite the wear on the impeller blades. The state of wear is ascertained using suitable, not-shown sensors that determine the distance between the inner wall and the peripheral circle of the post-accelerator.

Even though the present invention was described with reference to only one exemplary embodiment, one skilled in the technical art will deduce—in light of the above description—many diverse alternatives, modifications, and variants that fall within the scope of the present invention.

It will be understood that each of the elements described above, or two or more together, may also find a useful application in other types of constructions differing from the type described above.

While the invention has been illustrated and described as embodied in a device for adjusting the position of the post-accelerator in an agricultural harvesting machine, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A device for adjusting a crop material passage at a post-accelerator which is at least partially enclosed by a machine housing in an agricultural harvesting machine, the device comprising at least one processing device configured so that a crop material handed off by said processing device passes through the post-accelerator; a displacing mechanism configured to move the post-accelerator relative to the machine housing; and guide axles for fixing the post-accelerator in position on the machine housing such that the post-accelerator is decoupled from said displacing mechanism.

2. A device as defined in claim 1, wherein said guide axles for fixing the post-accelerator include sliding devices which are assignable to each end of the post accelerator and have bottom-side lower edges lying on guide surfaces connectable with the machine housing, said sliding devices being displaceably fixable in position on the machine housing; and further comprising at least one holding element for displaceably fixing said sliding devices in position on the machine housing.

3. A device as defined in claim 2, wherein said displacing mechanism is configured as a transmission system for displacing the post-accelerator.

4. A device as defined in claim 3, wherein said transmission system substantially includes at least two transmission elements which are rotatably connected at one end with said sliding devices of the post-accelerator and are operatively connected at the other end with a further transmission element which is supported such that it is rotatable around a curved path to adjust a position of said at least two transmission elements in a synchronous manner using said further transmission element.

5. A device as defined in claim 4, wherein said further transmission element is configured as a continuous shaft and is rotatably mountable on the machine housing; and further comprising at least two bearing elements for mounting said further transmission element of the machine housing.

6. A device as defined in claim 4; and further comprising at least one telescopic actuator assigned to said further transmission element and connected at one end via a pivot point with a lever arm assigned to said further transmission element and also connected at the other end via a pivot point with a holding device mountable on the machine housing.

7. A device as defined in claim 4; and further comprising at least one telescoping actuator which is operatably connected with said further transmission element and provides a synchronous adjustment of said at least two transmission elements.

8. A device as defined in claim 7, wherein said at least one telescoping actuator is configured as an element selected from the group consisting of a hydraulic motor and an electric linear motor.

9. A device as defined in claim 4, wherein said further transmission element is adjustable on its curved path in a direction of material flow.

10. A device as defined in claim 4; and further comprising a restraint device which is assigned to said further transmission element and includes an upper end stop and a lower end stop.

11. A device as defined in claim 4, wherein said at least two transmission elements are configured as coupling rods.

12. A device as defined in claim 1, wherein said displacing mechanism is configured to displace an axle of the post-accelerator in the horizontal direction based on a position of a transfer device located downstream of the post-accelerator.

13. A device as defined in claim 1, wherein said displacing mechanism is configured so that it displaces an axle of the post-accelerator in a horizontal direction depending on a state of wear of impeller blades assigned to the post-accelerator.

14. A device as defined in claim 1; and further comprising at least one sensor arrangeable at least at one point inside the machine housing and ascertaining a parameter of a crop material selected from the group consisting of a moisture, a density, a speed, and combinations thereof.

15. A device as defined in claim 14, wherein said displacement mechanism is configured to displace an axle of the post-accelerator in the horizontal direction based on sensor signals X, Y generated by said sensor.

16. A device as defined in claim 1; and further comprising a control unit for operating said displacing mechanism and arrangeable inside a driver's cab of the agricultural harvesting machine.

17. A device as defined in claim 1, wherein the device for adjusting the crop material passage is configured as a device provided at the post-accelerator in the agricultural harvesting machine which is a self-propelled forage harvester that includes at least one front attachment for picking up the crop material.

* * * * *